(12) United States Patent  
Umetsu et al.

(10) Patent No.: US 8,516,906 B2  
(45) Date of Patent: Aug. 27, 2013

(54) FORCE SENSOR AND METHOD OF MANUFACTURING THE SAME

(75) Inventors: Eiji Umetsu, Niigata-ken (JP); Masahiko Ishizone, Niigata-ken (JP); Motoki Hirayama, Niigata-ken (JP); Hideki Gochou, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 13/475,579

(22) Filed: May 18, 2012

(65) Prior Publication Data

US 2012/0234112 A1 Sep. 20, 2012

Related U.S. Application Data

(63) Continuation of application No. PCT/JP2010/072615, filed on Dec. 16, 2010.

(30) Foreign Application Priority Data

Dec. 25, 2009 (JP) ................................ 2009-295231  
Apr. 9, 2010 (JP) ................................ 2010-090884

(51) Int. Cl.
*G01L 1/04* (2006.01)
*G01L 1/10* (2006.01)
*H01L 21/00* (2006.01)

(52) U.S. Cl.
USPC ............ 73/862.627; 73/862.621; 73/862.625; 29/25.01

(58) Field of Classification Search
USPC ....... 73/862.625, 862.621, 862.627, 862.629, 73/862.632, 862.636, 862.637; 29/25.01
See application file for complete search history.

(56) References Cited

U.S. PATENT DOCUMENTS

| | | | | |
|---|---|---|---|---|
| 3,918,019 | A | * | 11/1975 | Nunn ............................. 338/42 |
| 4,079,508 | A | * | 3/1978 | Nunn ............................. 438/51 |
| 4,991,283 | A | * | 2/1991 | Johnson et al. ................ 29/595 |
| 5,200,363 | A | | 4/1993 | Schmidt |

(Continued)

FOREIGN PATENT DOCUMENTS

| | | |
|---|---|---|
| EP | 2 056 087 | 5/2009 |
| JP | 63-155676 | 6/1988 |

(Continued)

OTHER PUBLICATIONS

Search Report dated Mar. 1, 2011 from International Application No. PCT/JP2010/072615.

*Primary Examiner* — Lisa Caputo  
*Assistant Examiner* — Jonathan Dunlap  
(74) *Attorney, Agent, or Firm* — Beyer Law Group LLP

(57) ABSTRACT

A sensor substrate includes a plurality of piezoresistance elements. The electrical resistance of each piezoresistance element changes in accordance with an amount of displacement of a displacement portion displaced by an external load applied through a pressure receiving unit. A base substrate supports the sensor substrate. The sensor substrate and the base substrate each include a support supporting the displacement portion such that the displacement portion can be displaced and a plurality of electrically connecting portions electrically connected to the plurality of piezoresistance elements. The supports of the sensor and base substrates are joined to each other and the plurality of electrically connecting portions of the sensor and base substrates are joined to each other. Furthermore, in each of the sensor and base substrates, either the support or the plurality of electrically connecting portions or both extend to the periphery of the sensor substrate or the base substrate.

13 Claims, 12 Drawing Sheets

(56) References Cited

U.S. PATENT DOCUMENTS

| | | | | |
|---|---|---|---|---|
| 5,264,820 A | * | 11/1993 | Kovacich et al. | 338/42 |
| 5,589,810 A | * | 12/1996 | Fung | 338/4 |
| 5,861,558 A | * | 1/1999 | Buhl et al. | 73/777 |
| 6,056,888 A | * | 5/2000 | August | 216/16 |
| 8,297,125 B2 | * | 10/2012 | Stewart et al. | 73/716 |
| 2005/0186703 A1 | * | 8/2005 | Weiblen et al. | 438/106 |
| 2012/0144924 A1 | * | 6/2012 | Kotovsky | 73/777 |

FOREIGN PATENT DOCUMENTS

| | | |
|---|---|---|
| JP | 63-196080 | 8/1988 |
| JP | 7-294355 | 11/1995 |
| JP | 10-325772 | 8/1998 |
| JP | 11-68120 | 3/1999 |
| JP | 2001-284603 | 10/2001 |
| JP | 2007-240250 | 9/2007 |
| JP | 2008-89559 | 4/2008 |
| JP | 2008-196918 | 8/2008 |

* cited by examiner

FIG. 8

FORCE SENSOR AND METHOD OF MANUFACTURING THE SAME

CLAIM OF PRIORITY

This application is a Continuation of International Application No. PCT/JP2010/072615 filed on Dec. 16, 2010, which claims benefit of Japanese Patent Application No. 2009-295231 filed on Dec. 25, 2009 and No. 2010-090884 filed on Apr. 9, 2010. The entire contents of each application noted above are hereby incorporated by reference.

BACKGROUND OF THE INVENTION

1. Field of the Invention

The present invention relates to a force sensor including a base substrate joined to a sensor substrate having a plurality of piezoresistance elements for load measurement, and relates to a method of manufacturing the force sensor.

2. Description of the Related Art

Nowadays, force sensors for load measurement are used in user interfaces such as touch panels and controllers of mobile devices. A known force sensor includes a sensor substrate having a pressure receiving unit, a displacement portion, a support, piezoresistance elements, and electrically connecting portions formed therein. An external load is applied to the pressure receiving unit, the displacement portion is displaced in accordance with the load applied to the pressure receiving unit, the support supports the displacement portion from a surface, which is on a side opposite to a side on which the pressure receiving unit is provided, such that the displacement portion can be displaced, the piezoresistance elements detect the amount of displacement of the displacement portion, and the electrically connecting portions are electrically connected to the piezoresistance elements. The force sensor also has a base substrate joined to the sensor substrate so as to be mounted on an external object. Specifically, the force sensor can be connected to external circuitry as follows: Electrode pads of the base substrate, which are connected in an electrically conductive manner to the electrically connecting portions of the sensor substrate, are electrically connected to external circuitry by wire bonding. Alternatively, a package, in which the electrically connecting portions of the sensor substrate are connected to the electrode pads of the base substrate in an electrically conductive manner by wire bonding, is provided and electrically connected to external circuitry. A force sensor having such a related-art structure has been disclosed in, for example, Japanese Unexamined Patent Application Publication No. 10-325772.

SUMMARY OF THE INVENTION

In a related-art structure, as described, for example, in Japanese Unexamined Patent Application Publication No. 10-325772, a sensor substrate and a base substrate are joined to each other by anode bonding performed at a voltage of 500 to 1000 V and a temperature of 300 to 400° C. However, when the substrates are joined at a higher temperature of 250° C. or higher, residual stress may occur in substrate joining portions (the support and the electrically connecting portions of the sensor substrate) due to differences in thermal expansion coefficient among the sensor substrate, base substrate, and joining material. Accordingly, the sensor substrate may become distorted. Distortion of the sensor substrate decreases the force sensor yield due to, for example, a large shift in an output zero point or increased variation in the output zero point of a bridge circuit formed of the plurality of piezoresistance elements provided on the sensor substrate. With such a technology as described in PTL 1, in which pad electrodes are provided on a surface to be joined when the sensor substrate and the base substrate are joined to each other, and penetrating electrodes are used as leads extending out of the force sensor, both joining of the sensor substrate to the base substrate and joining of the pad electrodes to the leads need to be performed.

The present invention provides a force sensor and a method of manufacturing the force sensor, the force sensor being formed by joining a sensor substrate including a plurality of piezoresistance elements to a base substrate, in which distortion of the substrates due to residual stress after joining of the substrates can be decreased, and with which the yield can be improved.

The present invention has been completed by recognizing that residual stress occurring when joining the sensor substrate to the base substrate causes the sensor substrate to be distorted and the output zero point of the bridge circuit formed of the plurality of piezoresistance elements provided on the sensor substrate to shift, and by focusing attention on the fact that the residual stress due to joining of the sensor substrate to the base substrate can be decreased by joining the substrates to each other at a lower temperature of lower than 250° C.

That is, according to the present invention, a force sensor has a sensor substrate joined to a base substrate. The sensor substrate is provided with a plurality of piezoresistance elements. An electrical resistance of each piezoresistance element changes in accordance with an amount of displacement of a displacement portion that is displaced by an external load applied through a pressure receiving unit. In the force sensor, the sensor substrate includes a sensor-side support provided on a surface of the sensor substrate on which the plurality of piezoresistance elements are formed. The surface on which the sensor-side support is provided is on a side opposite to a side on which the pressure receiving unit is provided. At least part of the sensor-side support is positioned so as to be superposed with the plurality of piezoresistance elements in plan view. The sensor-side support supports the displacement portion such that the displacement portion is able to be displaced. In the force sensor, a plurality of sensor-side electrically connecting portions are provided closer to a periphery of the sensor substrate than the sensor-side support is. The plurality of sensor-side electrically connecting portions are each electrically connected to a corresponding one of the plurality of piezoresistance elements. The sensor-side support is formed to have a shape having a closed inner peripheral edge that surrounds an entire periphery of the displacement portion in plan view, the plurality of sensor-side electrically connecting portions are provided along the periphery of the sensor substrate so as to surround an outer periphery of the sensor-side support, and the plurality of sensor-side electrically connecting portions are separated from one another at positions that do not cross a virtual line passing through a center of the pressure receiving unit and a center of each of the plurality of piezoresistance elements. In the force sensor, the base substrate includes a base-side support, which is joined to the sensor-side support, provided on a surface on a side that is joined to the sensor substrate. The base substrate also includes a plurality of base-side electrically connecting portions, which are joined to the plurality of sensor-side electrically connecting portions, positioned closer to a periphery of the base substrate than the base-side support is. The base substrate also includes a plurality of electrode pads formed at ends of electrical wiring extending from the base-side electrically connecting portions. The plurality of electrode pads are capable of being connected to external circuitry.

According to this embodiment, sealing resin does not enter the displacement portion surrounded by the sensor-side support, and the plurality of sensor-side electrically connecting portions fill the space between the sensor-side support and the periphery of the sensor substrate. This suppresses entrance of the sealing resin, and accordingly, decreases residual stress caused when the resin is cured. In addition, separation of the plurality of sensor-side electrically connecting portions does not affect the plurality of piezoresistance elements.

The sensor-side support may also serve as one of the plurality of sensor-side electrically connecting portions.

The plurality of sensor-side electrically connecting portions may be each disposed at a corresponding one of corners of the sensor substrate having a rectangular shape in plan view, and the sensor-side support is preferably symmetrically formed with respect to a center of the displacement portion in plan view. According to this embodiment, the displacement portion can be stably supported. More specifically, the sensor-side support preferably has a closed inner peripheral edge that surrounds the entire periphery of the displacement portion and has a shape formed along the periphery of the sensor substrate except for the corners of the sensor substrate in plan view.

Preferably, the base substrate has the base-side support that has a shape having a closed inner peripheral edge corresponding to the inner peripheral edge of the sensor-side support in plan view, and the sensor-side support is joined to the base-side support so as to seal a space surrounded by the inner peripheral edges.

Preferably, the center of each of the piezoresistance elements is positioned within ±10 μm from a corresponding portion of the inner peripheral edge of the sensor-side support. According to this embodiment, the sensitivity of a sensor can be improved.

Preferably, the sensor-side support is joined to the base-side support with a metal joint layer disposed therebetween, and each sensor-side electrically connecting portion is joined to a corresponding one of base-side electrically connecting portions with a metal joint layer disposed therebetween. In this case, each of the metal joint layer has a thickness of 300 nm or smaller and is formed of an alloy including one or more of materials selected from the group consisting of Al, Ti, Cr, Ni, Cu, Ru, Rh, Ir, Pt, Ta, Fe, and Au, or a multilayer film composed of two or more layers each including a material selected from the group consisting of Al, Ti, Cr, Ni, Cu, Ru, Rh, Ir, Pt, Ta, Fe, and Au. According to this embodiment, metal joining at a low temperature lower than 250° C. can be performed.

The force sensor may include a package and sealing resin. In this case, the base substrate is secured to the package by adhesion, and the package includes a plurality of electrode pads electrically connected to the plurality of electrode pads of the base substrate by wire bonding and a plurality of terminals for external connection electrically connected to the plurality of electrode pads. The peripheries of the base substrate and the sensor substrate are secured on the package by sealing resin.

In an embodiment of a method of manufacturing according to the present invention, a method of manufacturing a force sensor includes the step of forming a number of sensor structures on one of front and rear panel surfaces of a sensor substrate panel having displacement portions. In this case, the sensor structures each include a plurality of piezoresistance elements. An electrical resistance of each piezoresistance element changes in accordance with an amount of displacement of the displacement portion that is displaced. The sensor structure also includes a sensor-side support. At least part of the sensor-side support is positioned so as to be superposed with the plurality of piezoresistance elements in plan view. The sensor-side support supports the displacement portion such that the displacement portion is able to be disposed. The sensor structure also includes a plurality of sensor-side electrically connecting portions positioned closer to a periphery of each sensor structure than the sensor-side support is. The plurality of sensor-side electrically connecting portions are each electrically connected to a corresponding one of the plurality of piezoresistance elements. The plurality of sensor-side electrically connecting portions are provided along the periphery of each sensor structure so as to surround an outer periphery of the sensor-side support and separated from one another at positions that do not cross a virtual line passing through a center of the pressure receiving unit and a center of each of the plurality of piezoresistance elements. The sensor-side support is formed to have a shape having a closed inner peripheral edge that surrounds an entire periphery of the displacement portion in plan view. The method also includes the step of forming a number of base structures on one of front and rear panel surfaces of a base substrate panel. The base structures each include a plurality of base-side electrically connecting portions corresponding to the plurality of sensor-side electrically connecting portions, a plurality of electrode pads formed at ends of electrical wiring extending from the base-side electrically connecting portions so as to be wire-bondable, and a base-side support positioned in an area surrounded by the plurality of base-side electrically connecting portions so as to correspond to the sensor-side support. The method also includes joining the sensor substrate panel and the base substrate panel to each other while pressing the sensor substrate panel and the base substrate panel against each other and simultaneously joining the plurality of sensor-side electrically connecting portions to the base-side electrically connecting portions and the sensor-side supports to the base-side supports in an atmosphere in which the temperature is in a range from room temperature to a temperature lower than 250° C., and forming a number of pressure receiving units on the other panel surface out of the front and rear panel surfaces of the sensor substrate panel. An external load is applied to a displacement portion of each sensor structure through a corresponding one of the pressure receiving units. The method also includes cutting the sensor substrate panel and the base substrate panel into chips, each of which includes a pair of the sensor structure and the base structure.

Preferably, each of the plurality of sensor-side electrically connecting portions, each of the plurality of base-side electrically connecting portions, and each of the sensor-side supports and each of the base-side supports have respective metal joint layers formed thereon. In this case, each metal joint layer has a thickness of 300 nm or smaller and is formed of an alloy including one or more of materials selected from the group consisting of Al, Ti, Cr, Ni, Cu, Ru, Rh, Ir, Pt, Ta, Fe, and Au, or a multilayer film composed of two or more layers each including a material selected from the group consisting of Al, Ti, Cr, Ni, Cu, Ru, Rh, Ir, Pt, Ta, Fe, and Au. In this case, each of the plurality of sensor-side electrically connecting portions is joined to a corresponding one of the plurality of base-side electrically connecting portions with the metal joint layers disposed therebetween, and each of the sensor-side supports is joined to a corresponding one of the base-side supports with the metal joint layers disposed therebetween.

According to the present invention, joining of the sensor-side support to the base-side support and joining of the sensor-side electrically connecting portions to the base-side electrically connecting portions are performed at a low temperature lower than 250° C., thereby decreasing the residual stress occurring when the sensor substrate and the base substrate are joined to each other. Furthermore, either the sensor-side and base-side supports or the plurality of sensor-side and base-side electrically connecting portions, or both are provided along the peripheries of the sensor substrate and the base substrate, thereby suppressing entrance of the sealing resin into a gap between the sensor substrate and the base substrate. Thus, a situation which adversely affects the plurality of piezoresistance elements provided on the sensor substrate can be prevented, and accordingly, a force sensor and a method of manufacturing the force sensor, with which the yield can be improved, can be provided.

BRIEF DESCRIPTION OF THE DRAWINGS

FIG. 8 is a schematic sectional view of a step following the step illustrated in FIG. 7;

DESCRIPTION OF THE PREFERRED EMBODIMENTS

Figure 1:
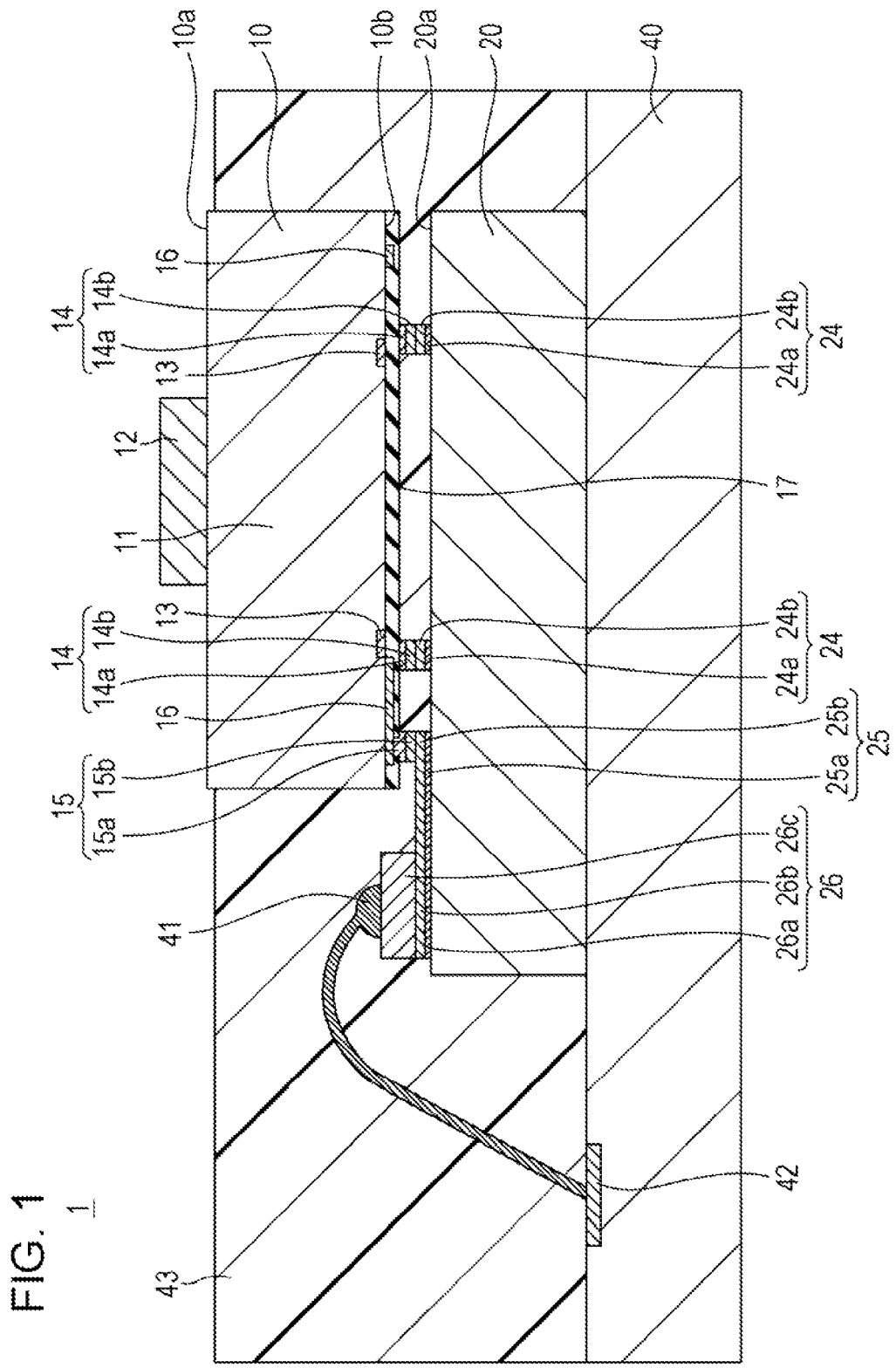
FIG. 1 is a schematic sectional view illustrating a first embodiment of a force sensor to which the present invention is applied.
Figure 2:
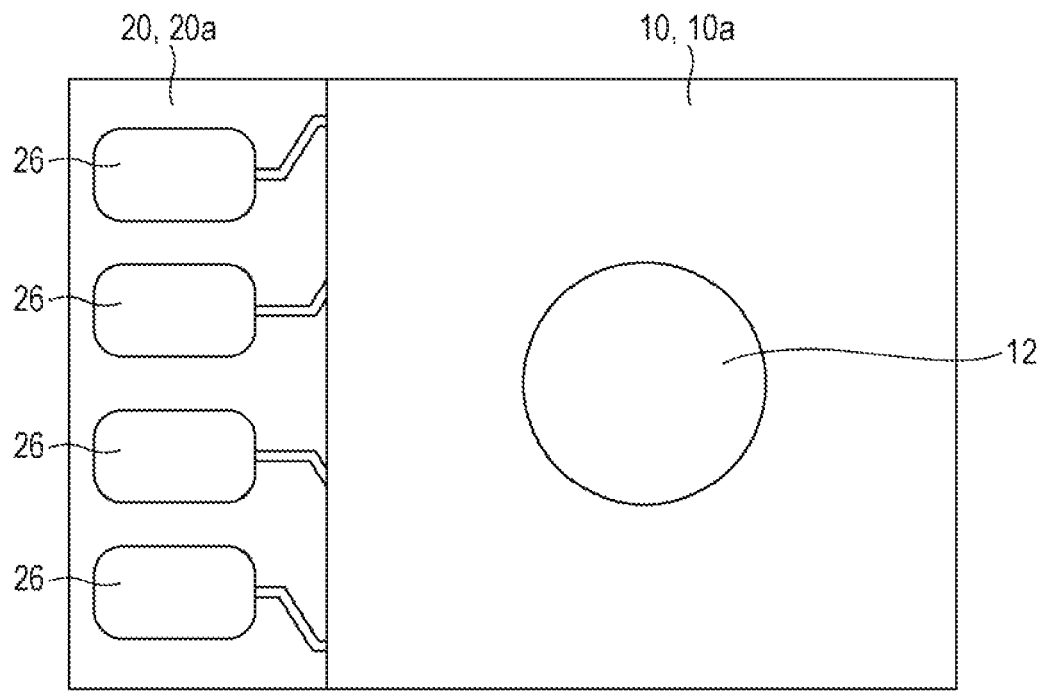
FIG. 2 is a plan view of the first embodiment of the force sensor seen from a top side.
Figure 3:
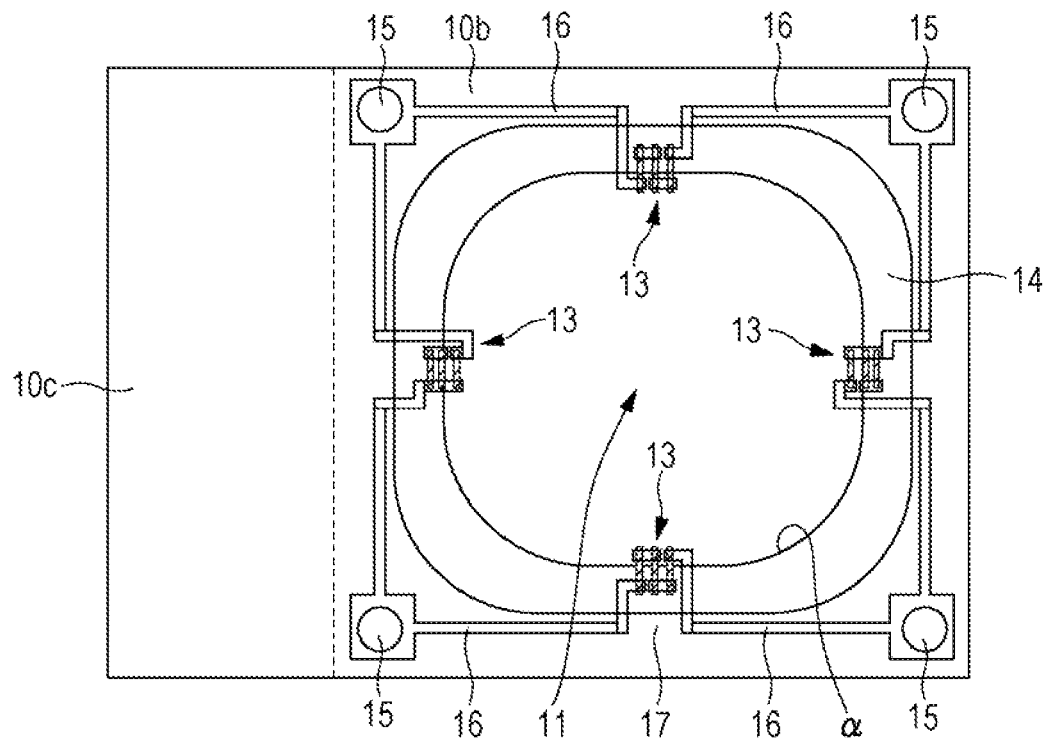
FIG. 3 is a plan view of a rear surface (surface to be joined) of a sensor substrate of the first embodiment of the force sensor.
Figure 4:
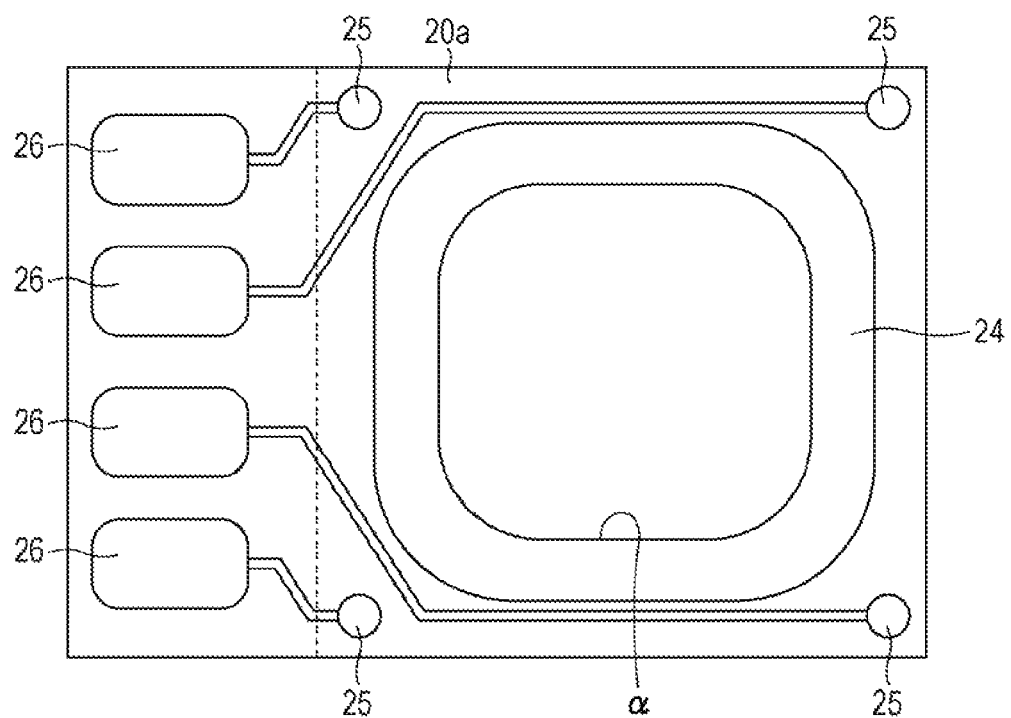
FIG. 4 is a plan view of a front surface (surface to be joined) of a base substrate of the first embodiment of the force sensor.

FIGS. 1 to 8 illustrate a first embodiment of a force sensor to which the present invention is applied. FIG. 1 is a sectional view of a force sensor 1, FIG. 2 is a plan view of the force sensor 1 seen from a top side, FIG. 3 is a plan view illustrating a rear surface 10b (a surface to be joined to a base substrate 20) of a sensor substrate 10, and FIG. 4 is a plan view illustrating a front surface 20a (a surface to be joined to the sensor substrate 10) of the base substrate 20.

The force sensor 1 is a piezoresistance force sensor including a pair of substrates, that is, the sensor substrate 10 and the base substrate 20.

The sensor substrate 10 has a rectangular shape in plan view and is formed of a silicon substrate that is of a uniform thickness and has a surface that is flat in a macroscopic view. A displacement portion 11 is formed at the center of the silicon substrate. The displacement portion 11 is displaced when a load is applied thereto. As illustrated in FIGS. 1 and 2, a pressure receiving unit 12, to which an external load is applied, is formed on a front surface 10a of the sensor substrate 10. The pressure receiving unit 12 is a protruding pressure receiving unit having a cylindrical shape that protrudes from the displacement portion 11. A periphery of an upper surface of the pressure receiving unit 12 is preferably rounded. The pressure receiving unit 12 is formed of a nickel alloy or silicon (the same material as the sensor substrate 10). The pressure receiving unit 12 may be omitted. However, the sensitivity of a sensor can be stabilized with the pressure receiving unit 12 provided on the displacement portion 11. As illustrated in FIGS. 1 and 3, a plurality of piezoresistance elements 13, support 14 (sensor-side support), a plurality of electrically connecting portions 15 (sensor-side electrically connecting portions), and circuit wiring 16 are provided on the rear surface 10b of the sensor substrate 10. The plurality of piezoresistance elements 13 serve as distortion detecting elements. The support 14 supports the displacement portion 11 such that the displacement portion 11 can be displaced. The plurality of electrically connecting portions 15 are electrically connected to the plurality of piezoresistance elements 13. The circuit wiring 16 connects the piezoresistance elements 13 to the electrically connecting portions 15. FIG. 3 illustrates the positional relationships in plan view among the piezoresistance elements 13, the support 14, the electrically connecting portions 15, and the circuit wiring 16, which are all drawn in solid lines.

The plurality of piezoresistance elements 13 are arranged in a phase in which every two adjacent piezoresistance elements 13 are spaced apart from each other by 90° (positional relationship in which they are perpendicular to each other) along a periphery of the displacement portion 11. When the displacement portion 11 is displaced by a load applied to the pressure receiving unit 12, electrical resistances of the plurality of piezoresistance elements 13 are changed in accordance with the amount of the displacement. This changes midpoint potentials of a bridge circuit formed by the plurality of piezoresistance elements 13. The changed midpoint potentials are output to a known measuring apparatus as sensor output.

The support 14 is formed on the rear surface 10b of the sensor substrate 10 so as to protrude from the rear surface 10b. The support 14 is positioned such that the support 14 is closer to a periphery of the sensor substrate 10 than the plurality of piezoresistance elements 13 arranged along the periphery of the displacement portion 11 are, and at least part of the support 14 is superposed with the plurality of piezoresistance elements 13 in plan view. As illustrated in FIG. 3, the support 14 according to the present embodiment has an annular shape in plan view (a shape having a closed inner peripheral edge α in plan view). The support 14 is symmetrically positioned with respect to the center of the displacement portion 11 in plan view. This allows the support 14 to stably support the displacement portion 11. The support 14 is formed of a multilayer structure made of a base layer 14a and a metal joint layer 14b. The metal joint layer 14b is formed of an alloy including one or more of materials selected from the group consisting of Al, Ti, Cr, Ni, Cu, Ru, Rh, Ir, Pt, Ta, Fe, and Au, or a multilayer film composed of two or more layers each including a material selected from the group consisting of Al, Ti, Cr, Ni, Cu, Ru, Rh, Ir, Pt, Ta, Fe, and Au.

As is the case with the support 14, the plurality of electrically connecting portions 15 are formed on the rear surface 10b of the sensor substrate 10 so as to protrude from the rear surface 10b. The electrically connecting portions 15 are positioned further closer to the periphery of the sensor substrate 10 than the support 14 is. As illustrated in FIG. 3, the electrically connecting portions 15 of the present embodiment each has a cylindrical shape and are each disposed at a corresponding one of four corners on the rear surface 10b of the sensor substrate 10 having a rectangular shape in plan view. In the plurality of electrically connecting portions 15, a pair of electrically connecting portions 15 that oppose each other on each of the diagonal lines of the sensor substrate 10 are symmetrical with respect to the center of the displacement portion 11 in plan view. This allows the electrically connecting portions 15 to stably support the displacement portion 11. The electrically connecting portions 15 are each formed of a multilayer structure made of a base layer 15a and a metal joint layer 15b. The metal joint layer 15b is formed of an alloy including one or more of materials selected from the group consisting of Al, Ti, Cr, Ni, Cu, Ru, Rh, Ir, Pt, Ta, Fe, and Au, or a multilayer film made of two or more layers each including a material selected from the group consisting of Al, Ti, Cr, Ni, Cu, Ru, Rh, Ir, Pt, Ta, Fe, and Au. The plurality of electrically connecting portions 15 are electrically connected to the plurality of piezoresistance elements 13 through the circuit wiring 16 formed on the rear surface 10b of the sensor substrate 10. The plurality of piezoresistance elements 13 and the circuit wiring 16 are covered with an insulating film 17 so as not to be exposed on the rear surface 10b of the sensor substrate 10.

The base substrate 20 has a rectangular shape in plan view and is formed of a silicon substrate that is of a uniform thickness and has a surface that is flat in macroscopic view. The base substrate 20 is a supporting substrate that is joined to the sensor substrate 10 so as to support the sensor substrate 10. As illustrated in FIG. 4, the base substrate 20 has a support 24, a plurality of electrically connecting portions 25, a plurality of electrode pads 26 on the front surface 20a, which is a surface to be joined to the sensor substrate 10. The support 24 having an annular shape in plan view (a shape having a closed inner peripheral edge α in plan view) corresponds to the support 14 of the sensor substrate 10. The plurality of electrically connecting portions 25, each of which has a cylindrical shape, correspond to the plurality of electrically connecting portions 15 of the sensor substrate 10. The plurality of electrode pads 26 are formed at ends of electrical wiring extending from the electrically connecting portions 25 so as to be wire-bondable. The support 24 and the plurality of electrically connecting portions 25 are formed on the front surface 20a of the base substrate 20 so as to protrude from the base substrate 20. As is the case with the support 14 of the sensor substrate 10, the support 24 is formed of a multilayer structure made of a base layer 24a and a metal joint layer 24b. The metal joint layer 24b is formed of an alloy including one or more of materials selected from the group consisting of Al, Ti, Cr, Ni, Cu, Ru, Rh, Ir, Pt, Ta, Fe, and Au, or a multilayer film composed of two or more layers each including a material selected from the group consisting of Al, Ti, Cr, Ni, Cu, Ru, Rh, Ir, Pt, Ta, Fe, and Au. As is the case with the plurality of electrically connecting portions 15 of the sensor substrate 10, the plurality of electrically connecting portions 25 are each formed of a multilayer structure made of a base layer 25a and a metal joint layer 25b. The metal joint layer 25b is formed of an alloy including one or more of materials selected from the group consisting of Al, Ti, Cr, Ni, Cu, Ru, Rh, Ir, Pt, Ta, Fe, and Au, or a multilayer film composed of two or more layers each including a material selected from the group consisting of Al, Ti, Cr, Ni, Cu, Ru, Rh, Ir, Pt, Ta, Fe, and Au. The electrode pads 26 are each formed of a multilayer structure made of a base layer 26a, a metal joint layer 26b, and a plated metal layer 26c. The metal joint layer 26b is formed of an alloy including one or more of materials selected from the group consisting of Al, Ti, Cr, Ni, Cu, Ru, Rh, Ir, Pt, Ta, Fe, and Au, or a multilayer film composed of two or more layers each including a material selected from the group consisting of Al, Ti, Cr, Ni, Cu, Ru, Rh, Ir, Pt, Ta, Fe, and Au. The plated metal layer 26c is formed of, for example, Cu, Au, Al, or the like. The base layers 24a, 25a, and 26a are simultaneously formed, and the metal joint layers 24b, 25b, and 26b are simultaneously formed.

The above-described sensor substrate 10 and the base substrate 20 are integrated into a unit by joining the metal joint layers 14b of the support 14 to the corresponding metal joint layers 24b of the support 24, and joining the metal joint layers 15b of the electrically connecting portions 15 to the corresponding metal joint layers 25b of the electrically connecting portions 25. The metal joint layers 14b, 15b, 24b, and 25b each have a thickness of 300 nm or smaller. With the thickness set within the above-described range, an alloy including one or more of materials selected from the group consisting of Al, Ti, Cr, Ni, Cu, Ru, Rh, Ir, Pt, Ta, Fe, and Au, or a multilayer film composed of two or more layers each including a material selected from the group consisting of Al, Ti, Cr, Ni, Cu, Ru, Rh, Ir, Pt, Ta, Fe, and Au has a surface roughness of 3 nm or smaller. By doing this, the supports 14 and 24 can be joined to each other and the plurality of electrically connecting portions 15 and 25 can be joined to each other at a low temperature in a range from room temperature to a temperature lower than 250° C. Each of the metal joint layers 14b, 15b, 24b, and 25b may have a single-layer or multilayer structure.

The base substrate 20 out of the sensor substrate 10 and the base substrate 20 having undergone metal joining is joined to a package substrate 40 by die-bonding, thereby allowing the sensor substrate 10 and the base substrate 20 to be mounted on an external object through the package substrate 40. That is, the plurality of electrode pads 26 provided on the base substrate 20 are each connected to a corresponding one of a plurality of intermediate electrodes 42 on the package substrate 40 by a bonding wire 41. Through the plurality of intermediate electrodes 42, the electrode pads 26 are electrically connected to terminals for external connection (not shown) provided on an outer surface of the package substrate 40. The sensor substrate 10 and the base substrate 20 on the package substrate 40 are covered by sealing resin 43 applied therearound. joining of the sensor substrate 10 to the base substrate 20 and joining of the base substrate 20 to the package substrate 40 are strengthened by the sealing resin 43.

Next, a method of manufacturing the force sensor according to the present invention will be described with reference to FIGS. 5 to 8. FIGS. 5 to 8 are schematic sectional views each illustrate a corresponding one of steps in a method of manufacturing the force sensor.

A sensor substrate panel 100 and a base substrate 200 are initially prepared. The sensor substrate panel 100 has a number of sensor structures formed on the rear panel surface 100*b*. Each sensor structure includes the above-described plurality of piezoresistance elements 13, support 14, plurality of electrically connecting portions 15, circuit wiring 16, and insulating film 17. The base substrate panel 200 has a number of base structures formed on the front panel surface 200*a*. Each base structure includes the above-described support 24, plurality of electrically connecting portions 25, and plurality of electrode pads 26. In the sensor substrate panel 10 and the base substrate panel 20, the supports 14 and 24 and the plurality of electrically connecting portions 15 and 25 are each formed of multilayer structure made of a corresponding one of the base layers 14*a*, 15*a*, 24*a*, and 25*a* and a corresponding one of the metal joint layers 14*b*, 15*b*, 24*b* and 25*b*. Each of the metal joint layers 14*b*, 15*b*, 24*b* and 25*b* is formed of an alloy including one or more of materials selected from the group consisting of Al, Ti, Cr, Ni, Cu, Ru, Rh, Ir, Pt, Ta, Fe, and Au, or a multilayer film composed of two or more layers each including a material selected from the group consisting of Al, Ti, Cr, Ni, Cu, Ru, Rh, Ir, Pt, Ta, Fe, and Au. The metal joint layers 14*b*, 15*b*, 24*b*, and 25*b* are each formed to have a thickness of 300 nm or smaller by, for example, sputtering deposition. When a film of the above-described alloy is formed to have a thickness of 300 nm or smaller, the film has a surface roughness of 3 nm or smaller. This allows the metal joint layers 14*b*, 15*b*, 24*b*, and 25*b* to be joined at a low temperature in a range from room temperature to a temperature lower than 250° C. In each sensor structure, a groove 10*c* for substrate dicing is formed in the rear panel surface 100*b* of the sensor substrate panel 100 so as to be superposed with the plurality of electrode pads 26 in plan view.

Figure 5:
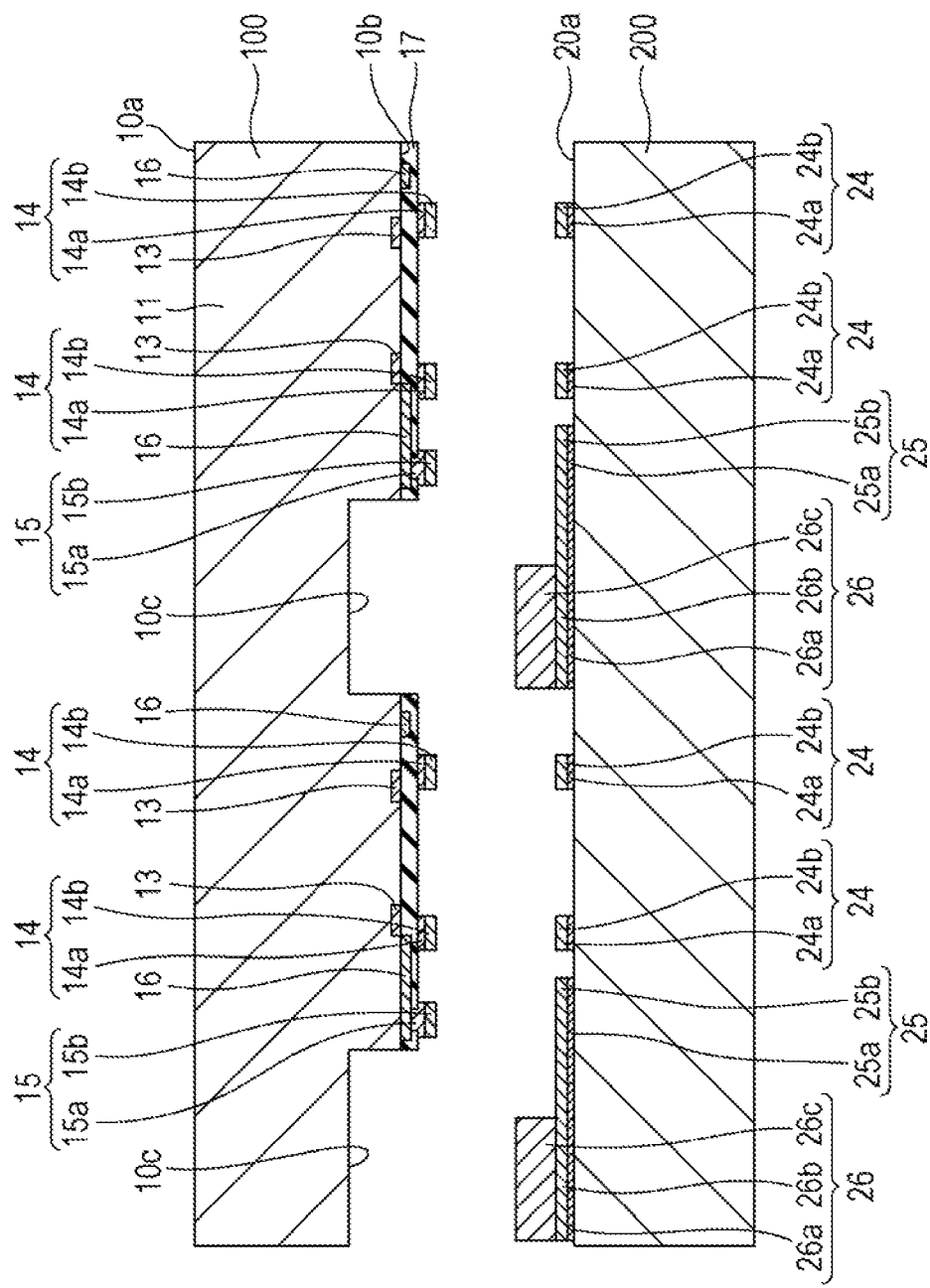
FIG. 5 is a schematic sectional view of a step in a method of manufacturing the force sensor according to the present invention.
Figure 6:
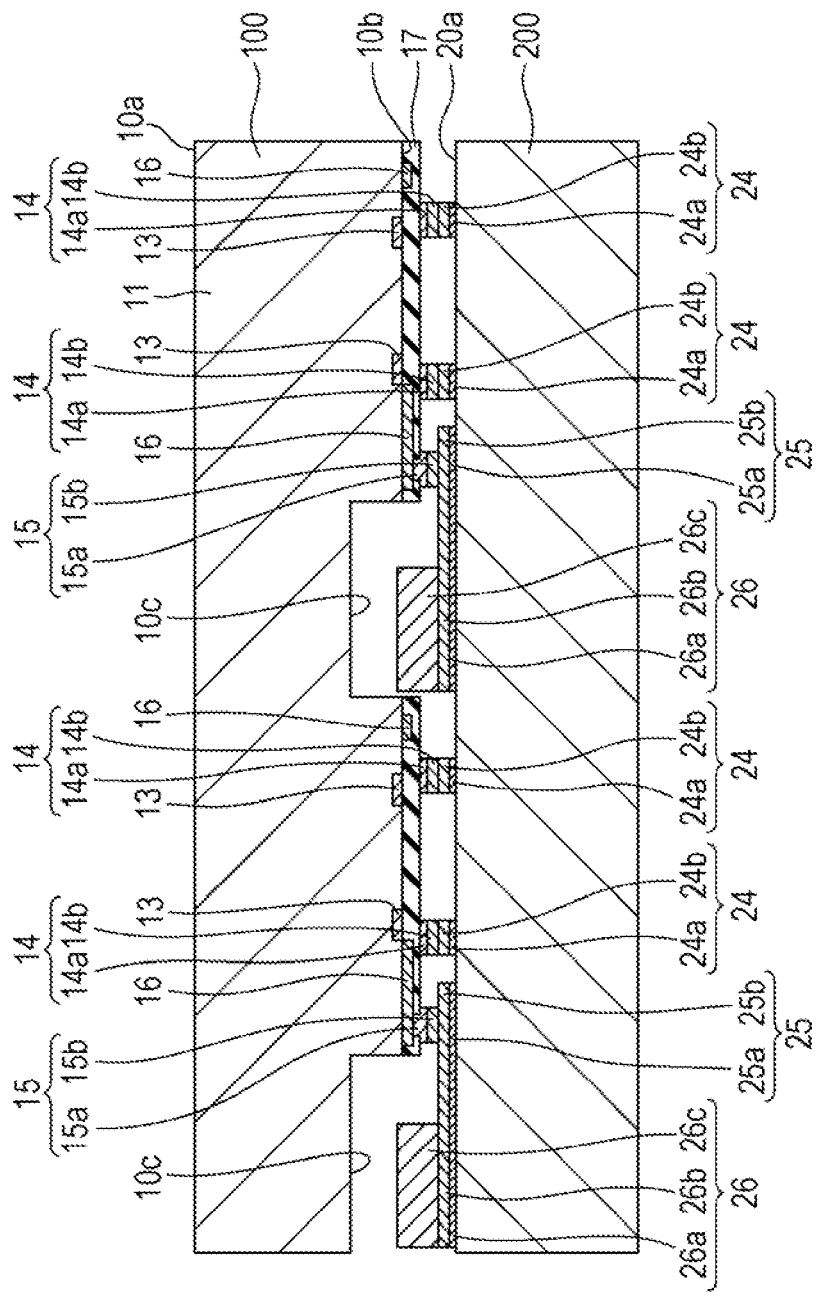
FIG. 6 is a schematic sectional view of a step following the step illustrated in FIG. 5.

Next, as illustrated in FIG. 5, the sensor substrate panel 100 and the base substrate panel 200 are arranged so as to oppose each other and respectively align the supports 14 and the plurality of electrically connecting portions 15 of the sensor substrate panel 100 with the supports 24 and the plurality of electrically connecting portions 25 of the base substrate panel 200 in plan view. Then, as illustrated in FIG. 6, the sensor substrate panel 100 and the base substrate panel 200 are joined to each other while the sensor substrate panel 100 and the base substrate panel 200 are pressed against each other at a low temperature in a range from room temperature to a temperature lower than 250° C. The supports 14 and 24 are desirably joined to each other and electrically connecting portions 15 and 25 are desirably joined to each other at a low temperature lower than 250° C. with the metal joint layers 14*b* and 24*b*, and 15*b* and 25*b* disposed therebetween. Thus, heating at a high temperature of 250° C. or higher is no longer necessary for joining. By doing this, residual stress occurring due to heat during joining is unlikely to occur in the supports 14 and 24 and the plurality of electrically connecting portions 15 and 25, or even if residual stress occurs, the residual stress is decreased compared to that occurring in the case where heating temperature is higher. This suppresses occurrence of distortion of the sensor substrate panel 100 and the base substrate panel 200, and accordingly, a shift in the output zero point of the bridge circuit formed of the plurality of piezoresistance elements 13 on each sensor substrate 10 can be avoided. Since the supports 14 and 24 according to the present embodiment are each formed to have an annular shape in plan view (a shape having a closed inner peripheral edge α in plan view), a space surrounded by peripheral edges a of the supports 14 and 24 are sealed by joining of the supports 14 and 24.

Figure 7:
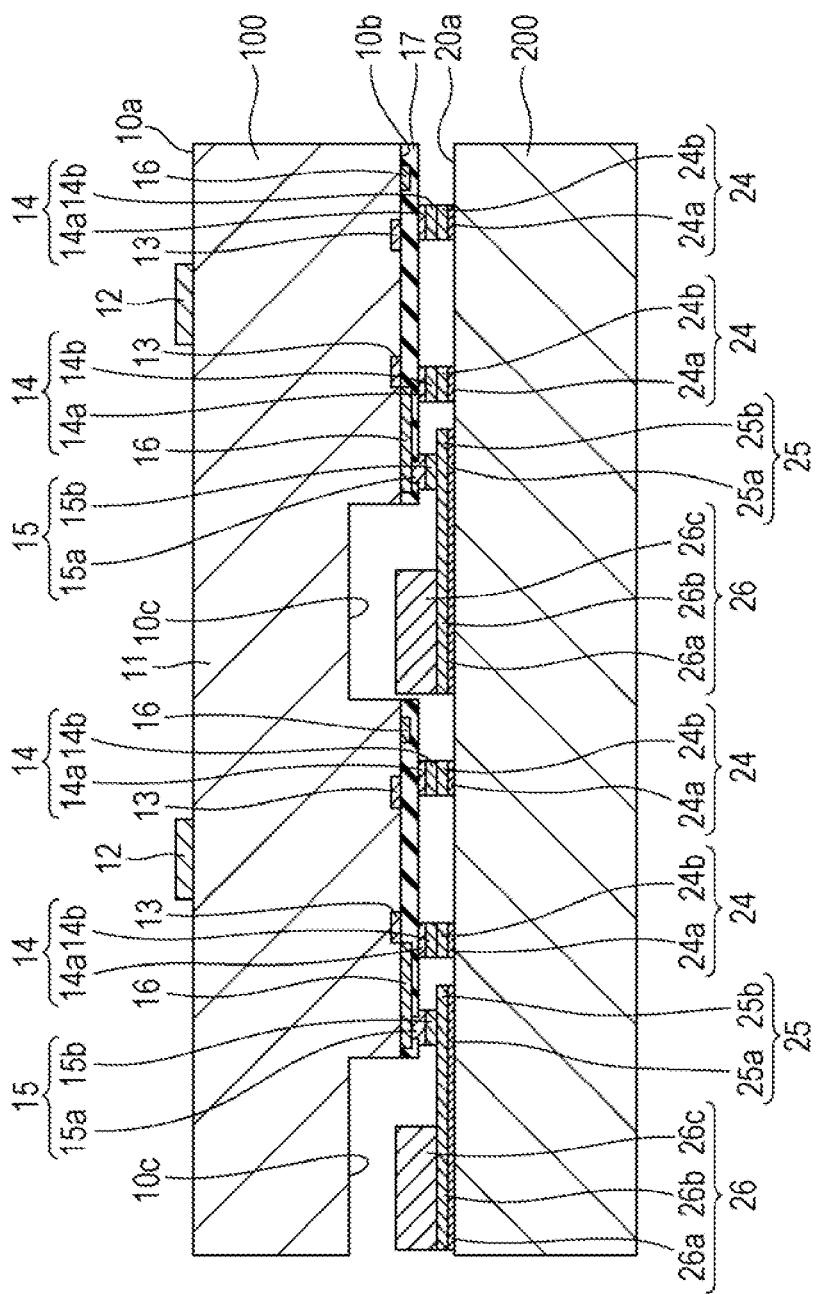
FIG. 7 is a schematic sectional view of a step following the step illustrated in FIG. 6.

After the substrate panels have been joined to each other, as illustrated in FIG. 7, the pressure receiving units 12, each of which receives an external load, is formed on the front panel surface 100*a* of the sensor substrate panel 100.

Figure 8:
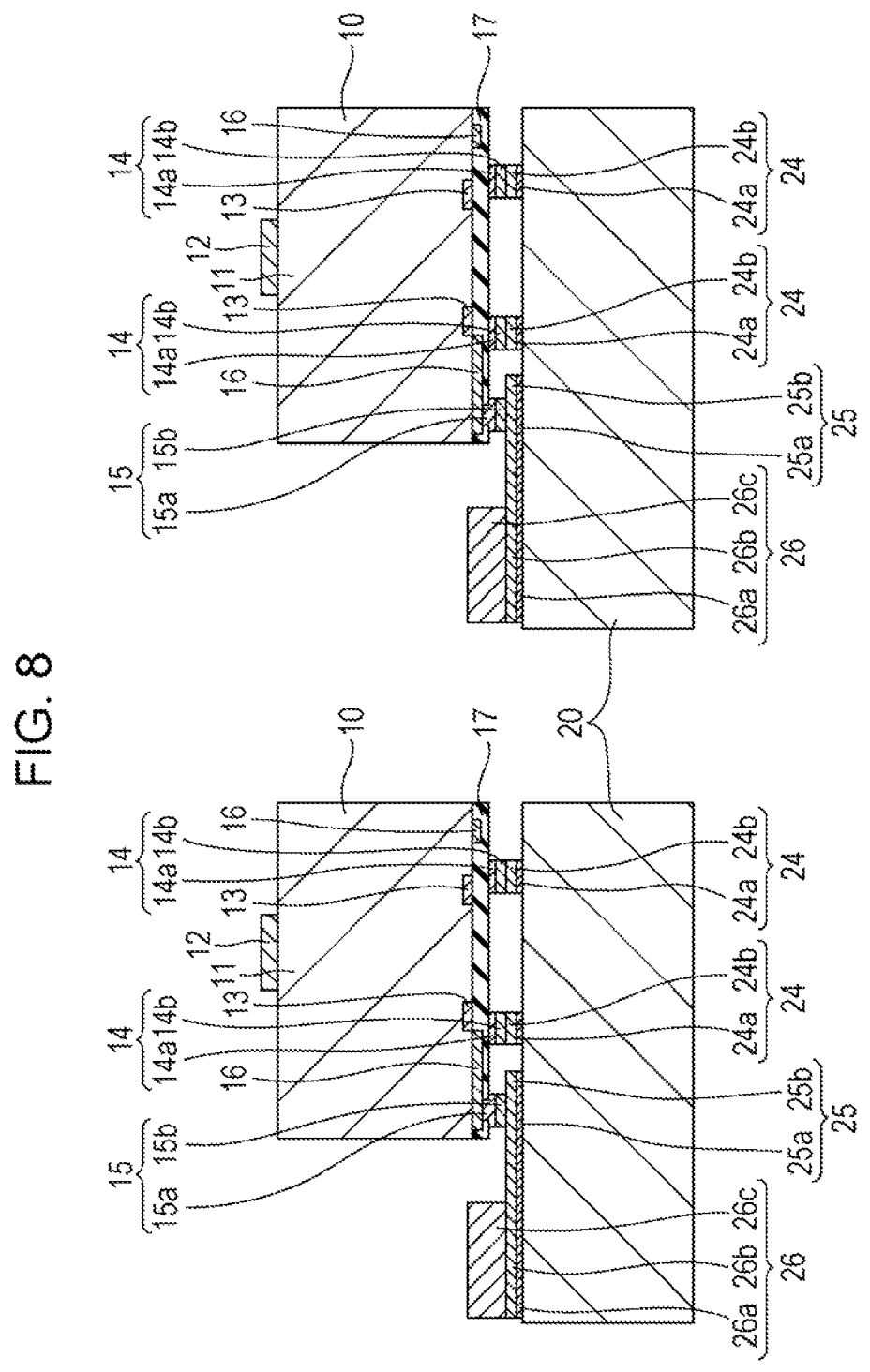

Then, as illustrated in FIG. 8, the sensor substrate panel 100 is cut at positions where the rear panel surface 100*b* and the grooves 10*c* are at heights different from each other so as to expose the plurality of electrode pads 26 of each base substrate 20. The base substrate panel 100 is cut into chips, each of which includes a pair of the sensor structure and base structure.

Thus, a number of the force sensors 1 illustrated in FIGS. 1 to 4 have been simultaneously obtained.

According to the first embodiment, the sensor substrate 10 and the base substrate 20 are provided with the corresponding supports 14 and 24 and the corresponding plurality of electrically connecting portions 15 and 25. The supports 14 and 24 are joined to each other with the metal joint layers 14*b* and 24*b* disposed therebetween, and the plurality of electrically connecting portions 15 and 25 are connected to each other with the metal joint layer 15*b* and 25*b* disposed therebetween at a low temperature of lower than 250° C. Thus, residual stress occurring in substrate joining portions (supports 14 and 24 and the plurality of electrically connecting portions 15 and 25) are decreased compared to that occurring in the case where heating temperature is a high temperature of 250° C. or higher. This suppresses occurrence of distortion of the substrates having been joined, and accordingly, prevents the plurality of piezoresistance elements 13 formed on the sensor substrate 10 from being adversely affected. By doing this, a shift in the output zero point of the bridge circuit formed of the plurality of piezoresistance elements 13 can be decreased, thereby improving the yield.

Although the supports 14 and 24 each have an annular shape in plan view in the first embodiment, the shapes in plan view of the supports formed on the sensor substrate 10 and the base substrate 20 may be changed. For example, the supports 14 and 24 of the present embodiment each having an annular shape in plan view may be divided into a plurality of pieces, or the plurality of supports having a square column-like shape or cylindrical shape may be provided. When the plurality of supports are formed, there is a freedom with respect to positions where the plurality of supports are provided as long as the supports are located closer to the peripheries of the sensor substrate 10 and the base substrate 20 than the plurality of piezoresistance elements 13 are and the plurality of supports are at least partly superposed with the plurality of piezoresistance elements 13 in plan view. However, in order to stably support the displacement portion 11, the supports are preferably symmetrically disposed with respect to the center of the displacement portion 11 in plan view.

In the first embodiment, the package substrate 40 that can be mounted on an external object is provided. However, the package substrate 40 may be omitted and the plurality of electrode pads 26 of the base substrate 20 may be directly connected to external circuitry by wire bonding. Mounting on an external object is easily performed also with this structure.

In the above-described first embodiment, in order to improve the strength at which the substrates are joined to each other, the sensor substrate 10 and the base substrate 20 are secured by the sealing resin 43 applied around the sensor substrate 10 and the base substrate 20. However, the following problem has been found: in the case where the peripheries of the sensor substrate 10 and the base substrate 20 are secured by the sealing resin 43, the sealing resin 43 enters the gap formed around the sensor substrate 10 and the base substrate 20 and reaches the outer sides of the supports 14 and 24. Residual stress in the sealing resin 43 occurring when the resin 43 is cured causes the sensor substrate 10 to be distorted, thereby changing sensor characteristics (sensor sensitivity and the output zero point of the bridge circuit formed of the plurality of piezoresistance elements 13). Electrical wiring is formed on the rear surface 10b of the sensor substrate 10 and the front surface 20a of the base substrate 20. Because of the presence of the electrical wiring, the size of the gap between the sensor and base substrates 10 and 20 varies from position to position. The magnitude of the residual stress occurring in the sealing resin 43 increases or decreases in accordance with the volume of the sealing resin 43 having entered the gap between the sensor and base substrates 10 and 20. This degrades a symmetry property of the sensor substrate 10 because the residual stress occurring in the sealing resin 43 is large in some portions and small in other portions. This causes variations in the sensor characteristics.

Second to fourth embodiments described below are examples of improvement of the first embodiment. In those embodiments, it is intended that the supports or the electrically connecting portions, or both are extended to the peripheries of the sensor substrate 10 and the base substrate 20 so as to decrease the amount of the sealing resin entering the gap between the sensor substrate and the base substrate, thereby suppressing distortion of the substrates caused by residual stress occurring when the resin is cured and accordingly, suppressing variations in sensor characteristics.

Figure 9:
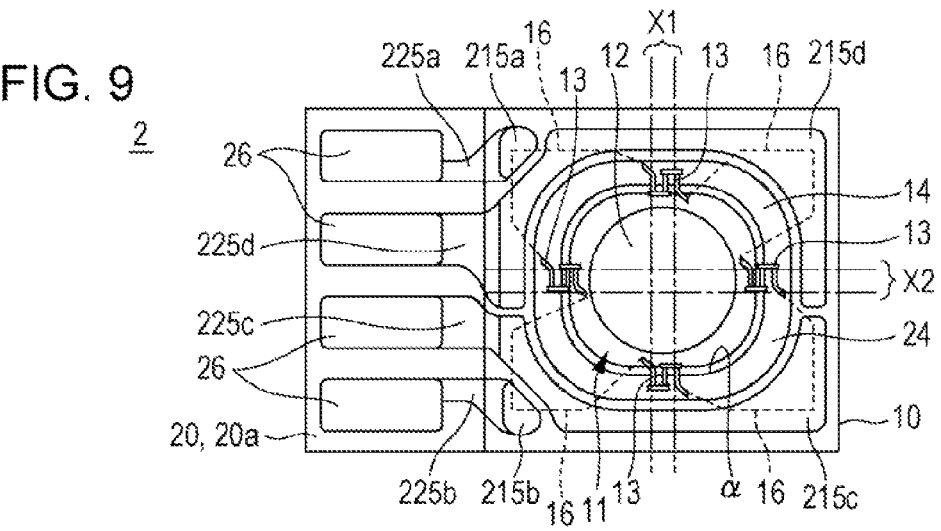
FIG. 9 is a top cut-away view of a second embodiment of a force sensor to which the present invention is applied seen from a top side.
Figure 10:
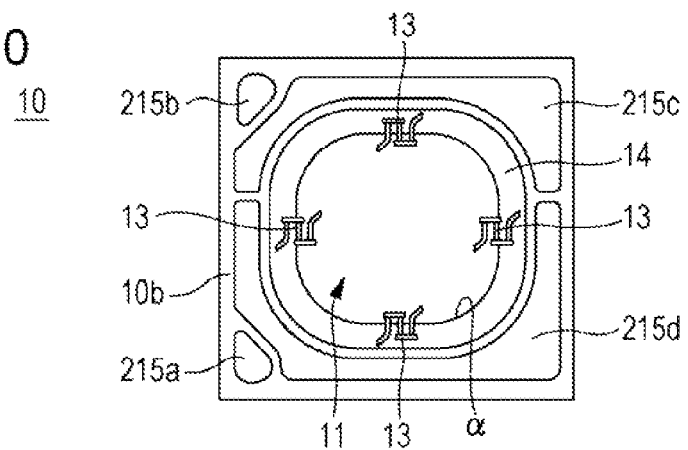
FIG. 10 is a plan view of a rear surface (surface to be joined) of a sensor substrate of the second embodiment of the force sensor.
Figure 11:
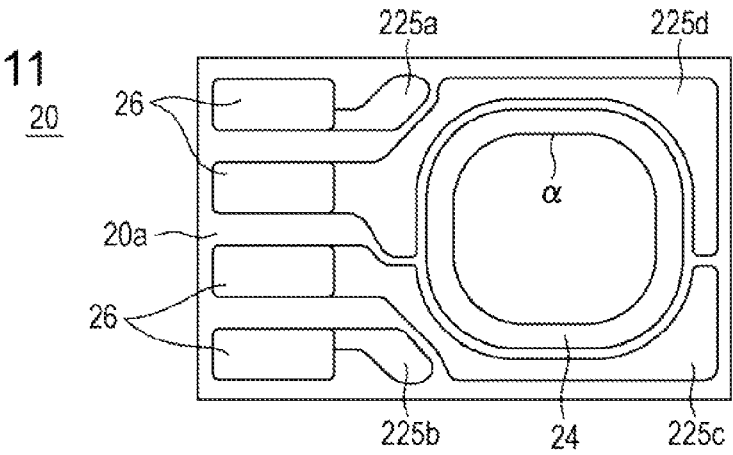
FIG. 11 is a plan view of a front surface (surface to be joined) of a base substrate of the second embodiment of the force sensor.

FIGS. 9 to 11 illustrate the second embodiment of a force sensor to which the present invention is applied. FIG. 9 is a top cut-away view of a force sensor 2 seen from a top side, FIG. 10 is a plan view illustrating the rear surface 10b of the sensor substrate 10, and FIG. 11 is a plan view illustrating the front surface 20a of the base substrate 20. In FIG. 10, illustration of the circuit wiring 16 is omitted.

As illustrated in FIG. 10, the support 14 and a plurality of electrically connecting portions 215a to 215d are formed so as to protrude from the rear surface 10b of the sensor substrate 10. FIG. 10 illustrates the positional relationships in plan view among the pressure receiving unit 12, the piezoresistance elements 13, the support 14, and the electrically connecting portions 215a to 215d, which are all drawn in solid lines. As is the case with the support 14 in the first embodiment, the support 14 has an annular shape in plan view (a shape having a closed inner peripheral edge α that surrounds the outer periphery of the displacement portion 11 in plan view). The center of each of the piezoresistance elements 13 is positioned within ±10 μm from a corresponding portion of inner peripheral edge α so as to allow the plurality of piezoresistance elements 13 to detect the displacement amount of the displacement portion 11 with high sensitivity. The plurality of electrically connecting portions 215a to 215d are disposed along a periphery of the sensor substrate 10, extending in a peripheral direction of the sensor substrate 10 so as to surround an outer periphery of the support 14 having annular shape in plan view. The plurality of electrically connecting portions 215a to 215d are separated from one another at positions that do not cross an area between virtual lines X1 and an area between virtual lines X2 in FIG. 9. The area between virtual lines X1 and the area between virtual lines X2 are areas that pass through the center of the pressure receiving unit 12 and the centers of the piezoresistance elements 13 at opposite positions. The area between virtual lines X1 and the area between virtual lines X2 are perpendicular to each other at the center of the sensor substrate 10 (the center of the pressure receiving unit 12). Since the plurality of electrically connecting portions 215a to 215d are separated from one another at positions that do not cross the area between virtual lines X1 and and the area between virtual lines X2, the symmetry property of the sensor substrate 10 can be maintained as much as possible, and separation of the electrically connecting portion do not affect the plurality of piezoresistance elements 13. In the present embodiment, a pair of the electrically connecting portions 215c and 215d surrounds the outer periphery of the support 14, and the remaining pair of the electrically connecting portions 215a and 215b are disposed symmetrically with respect to the area between virtual lines X2 at positions closer to the periphery of the sensor substrate 10 than those of the electrically connecting portions 215c and 215d are. The gaps by which the electrically connecting portions 215a to 215d are separated away from one another and the gaps by which the electrically connecting portions 215c and 215d are separated away from the support 14 are each about 0.2 μm.

As illustrated in FIG. 11, the support 24, a plurality of electrically connecting portions 225a to 225d, and the plurality of electrode pads 26 are provided on the front surface 20a of the base substrate 20. The support 24 and the plurality of electrically connecting portions 225a to 225d are formed so as to protrude in shapes and at positions in plan view corresponding to the support 14 and the plurality of electrically connecting portions 215a to 215d formed on the sensor substrate 10. The plurality of electrode pads 26 are formed at ends of electrical wiring extending from the electrically connecting portions 225a to 225d so as to be wire-bondable. The support 24 and the plurality of electrically connecting portions 225a to 225d on the base substrate 20 side are each formed to have a size a little larger than that of the corresponding one of the support 14 and the plurality of electrically connecting portions 215a to 215d on the sensor substrate 10 side with consideration of alignment with the support 14 and the plurality of electrically connecting portions 215a to 215d on the sensor substrate 10 side.

According to the second embodiment, the sealing resin 43 does not enter the displacement portion 11 surrounded by the supports 14 and 24, and the plurality of electrically connecting portions 215a to 215d and 225a to 225d fill the space between the outer peripheries of the supports 14 and 24 and the peripheries of the sensor substrate 10 and the base substrate 20. Thus, the size of the gap formed between the sensor substrate 10 and the base substrate 20, which have been joined to each other, is decreased compared to that of the first embodiment, thereby decreasing the amount of the sealing resin 43 that enters the gap. By doing this, the residual stress occurring when the resin is cured is also decreased, and accordingly, distortion of the sensor substrate 10 caused by the residual stress is suppressed. This prevents the plurality of piezoresistance elements 13 provided on the sensor substrate 10 from being adversely affected. That is, variations in the sensor characteristics can be suppressed, and accordingly, the yield can be improved. The gap formed between each of the plurality of electrically connecting portions 215a to 215d and 225a to 225d and a corresponding portion of the peripheries of the sensor substrate 10 and the base substrate 20 is preferably 30 μm or smaller. The structure other than the plurality of electrically connecting portions 215a to 215d and 225a to 225d is similar to the structure of the first embodiment.

Figure 12:
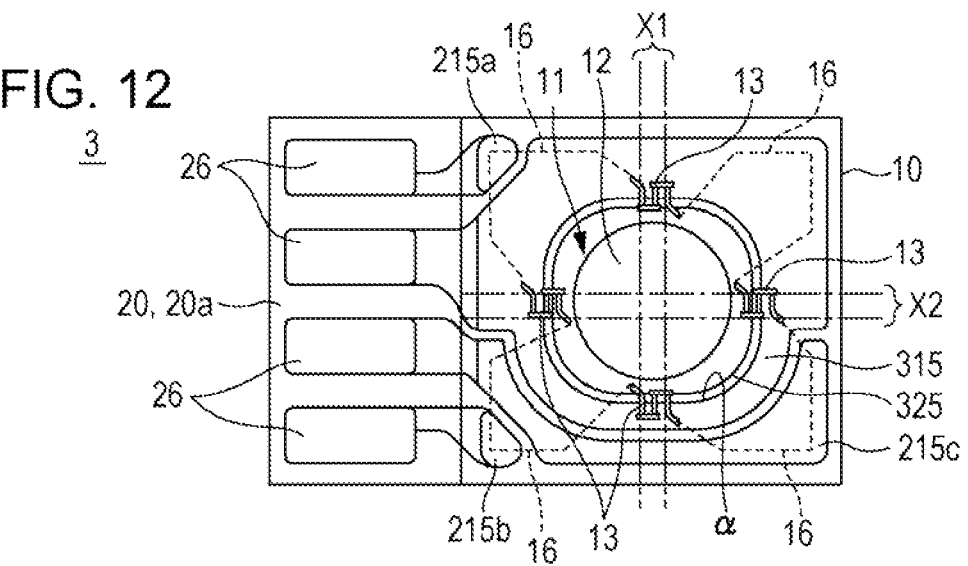
FIG. 12 is a top cut-away view of a third embodiment of a force sensor to which the present invention is applied seen from a top side.
Figure 13:
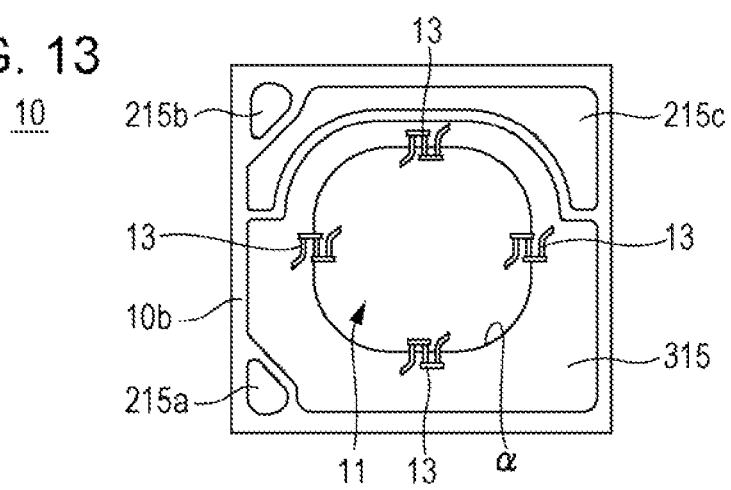
FIG. 13 is a plan view of a rear surface (surface to be joined) of a sensor substrate of the third embodiment of the force sensor.
Figure 14:
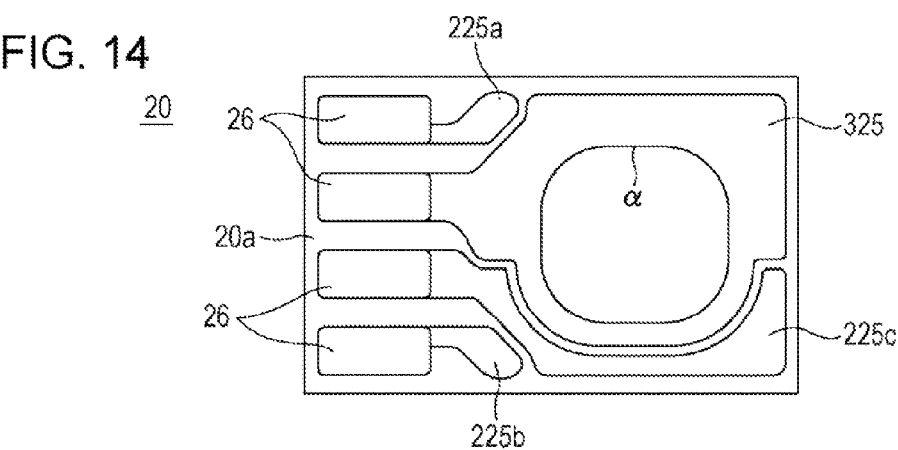
FIG. 14 is a plan view of a front surface (surface to be joined) of a base substrate of the third embodiment of the force sensor.

FIGS. 12 to 14 illustrate the third embodiment of a force sensor to which the present invention is applied. FIG. 12 is a top cut-away view of a force sensor 3 seen from a top side, FIG. 13 is a plan view illustrating the rear surface 10b of the sensor substrate 10, and FIG. 14 is a plan view illustrating the front surface 20a of the base substrate 20. In FIG. 13, illustration of the circuit wiring 16 is omitted.

In the force sensor 3 according to the third embodiment, a support also serves as one of a plurality of electrically connecting portions in the sensor substrate 10 and the base substrate 20. The support 14 and one of the electrically connecting portions 215d that surrounds the outer periphery of the support 14 in the second embodiment are integrated into an electrically connecting support 315 formed on the rear surface 10b of the sensor substrate 10. The support 24 and one of the electrically connecting portions 225d that surrounds the outer periphery of the support 24 in the second embodiment are integrated into an electrically connecting support 325 formed on the front surface 20a of the base substrate 20. The electrically connecting supports 315 and 325 are each formed to have a closed inner peripheral edge α that surrounds the outer periphery of the displacement portion 11 in plan view. The center of each of the piezoresistance elements 13 is positioned within ±10 μm from a corresponding portion of the inner peripheral edge a so as to allow the plurality of piezoresistance elements 13 to detect the displacement amount of the displacement portion 11 with high sensitivity. The electrically connecting support 325 on the base substrate 20 side is formed to have a size a little larger than that of the electrically connecting support 315 on the sensor substrate 10 side with consideration of alignment with the electrically connecting support 315. FIG. 13 illustrates the positional relationships in plan view among the piezoresistance elements 13, the electrically connecting portions 215a to 215c, and the electrically connecting support 315, which are all drawn in solid lines.

Also in the third embodiment, the sealing resin 43 does not enter the displacement portion 11 surrounded by the electrically connecting supports 315 and 325, and the electrically connecting supports 315 and 325 and the plurality of electrically connecting portions 215a to 215c and 225a to 225c fill the space between the displacement portion 11 and the peripheries of the sensor substrate 10 and the base substrate 20. Thus, as is the case with the second embodiment, the amount of the sealing resin 43 that enters the gap between the sensor substrate 10 and the base substrate 20 having been joined to each other is decreased compared to that of the first embodiment, and accordingly, variations in sensor characteristics caused by residual stress occurring when the resin is cured can be suppressed. The structure other than the electrically connecting supports 315 and 325 and the plurality of electrically connecting portions 215a to 215c and 225a to 225c is similar to the structure of the first embodiment.

Figure 15:
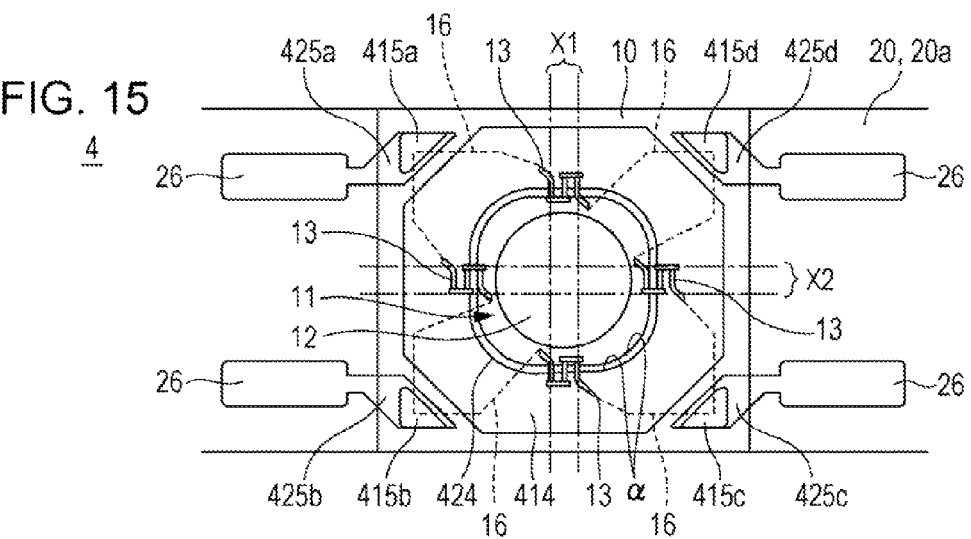
FIG. 15 is a top cut-away view of a fourth embodiment of a force sensor to which the present invention is applied seen from a top side.
Figure 16:
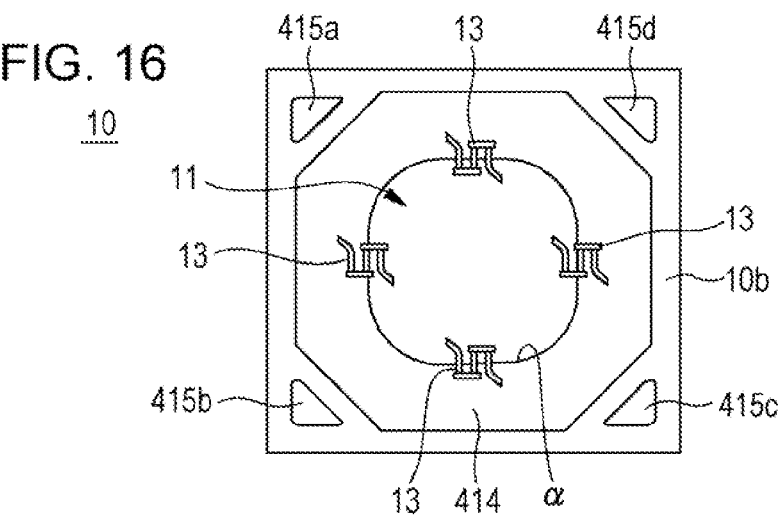
FIG. 16 is a plan view of a rear surface (surface to be joined) of a sensor substrate of the fourth embodiment of the force sensor.
Figure 17:
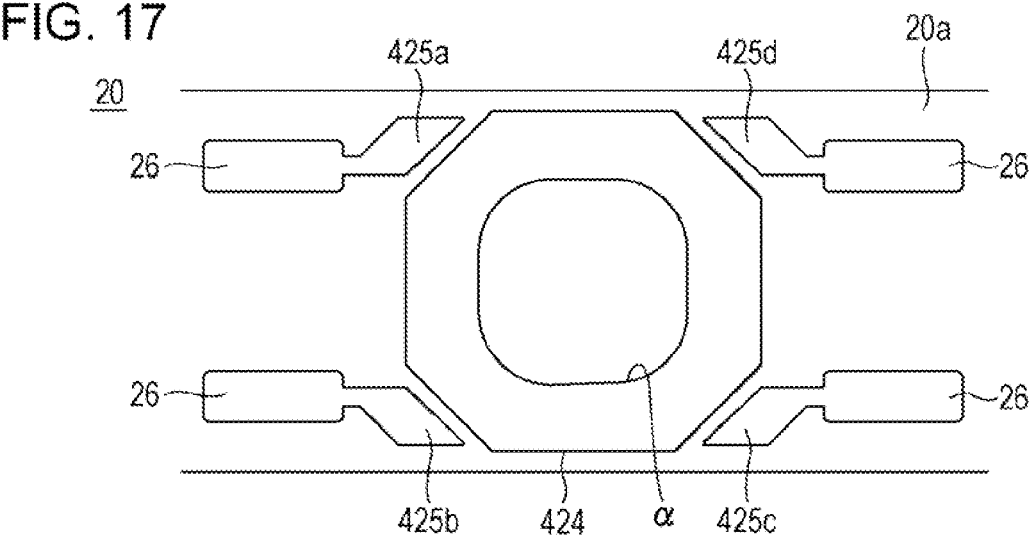
FIG. 17 is a plan view of a front surface (surface to be joined) of a base substrate of the fourth embodiment of the force sensor.

FIGS. 15 to 17 illustrate the fourth embodiment of a force sensor to which the present invention is applied. FIG. 15 is a top cut-away view of a force sensor 4 seen from a top side, FIG. 16 is a plan view illustrating the rear surface 10b of the sensor substrate 10, and FIG. 17 is a plan view illustrating the front surface 20a of the base substrate 20. In FIG. 16, illustration of the circuit wiring 16 is omitted.

As illustrated in FIG. 16, a plurality of electrically connecting portions 415a to 415d and support 414 are disposed on the rear surface 10b of the sensor substrate 10 having a rectangular shape in plan view. The plurality of electrically connecting portions 415a to 415d are disposed at corners of the rear surface 10b. The support 414 has a closed inner peripheral edge α that surrounds the outer periphery of the displacement portion 11 and is formed along the periphery of the sensor substrate 10 except for the corners of the rear surface 10b. In other words, the support 414 extends from the inner peripheral edge a to the periphery of the sensor substrate 10 except for the corners of the sensor substrate 10 so as to have a substantially octagonal outline (contour). The center of each of the piezoresistance elements 13 is positioned within ±10 μm from a corresponding portion of the inner peripheral edge α of the support 414 so as to allow the plurality of piezoresistance elements 13 to detect the displacement amount of the displacement portion 11 with high sensitivity. The gap formed between the support 414 and each of the electrically connecting portions 415a to 415d is about 0.2 μm. FIG. 16 illustrates the positional relationships in plan view among the piezoresistance elements 13, the support 414, and the electrically connecting portions 415a to 415d, which are all drawn in solid lines.

As illustrated in FIG. 17, a support 424, a plurality of electrically connecting portions 425a to 425d, and the plurality of electrode pads 26 are disposed on the front surface 20a of the base substrate 20. The support 424 and the plurality of electrically connecting portions 425a to 425d are formed so as to protrude in shapes and at positions in plan view corresponding to the support 414 and the plurality of electrically connecting portions 415a to 415d formed on the sensor substrate 10. The plurality of electrode pads 26 are formed at ends of electrical wiring extending from the electrically connecting portions 425a to 425d so as to be wire-bondable. The support 424 and the plurality of electrically connecting portions 425a to 425d on the base substrate 20 side are each formed to have a size a little larger than that of the corresponding one of the support 414 and the plurality of electrically connecting portions 415a to 415d on the sensor substrate 10 side with consideration of alignment with the support 414 and the plurality of electrically connecting portions 415a to 415d. Four electrode pads 26 are arranged corresponding to the plurality of electrically connecting portions 425a to 425d. Out of the electrode pads 26, two electrode pads 26 extend leftward and the remaining two extend rightward.

Also in the fourth embodiment, the sealing resin 43 does not enter the displacement portion 11 surrounded by the inner peripheral edges α of the supports 414 and 424, and the supports 414 and 424 and the plurality of electrically connecting portions 415a to 415d and 425a to 425d fill the space between the outer periphery of the displacement portion 11 and the peripheries of the sensor substrate 10 and the base substrate 20. Thus, as is the case with the second embodiment, the amount of the sealing resin 43 that enters the gap between the sensor substrate 10 and the base substrate 20 having been joined to each other is decreased compared to that of the first embodiment, and accordingly, variations in sensor characteristics caused by residual stress occurring when the resin is cured can be suppressed. In the fourth embodiment, the supports 414 and 424 and the plurality of electrically connecting portions 415a to 415d and 425a to 425d are symmetrically disposed with respect to an area between virtual lines X1 and an area between virtual lines X2 in FIG. 15. The area between virtual lines X1 and the area between virtual lines X2 are areas that pass through the center of the pressure receiving unit 12 and the centers of the piezoresistance elements 13 at opposite positions. The area between virtual lines X1 and the area between virtual lines X2 are perpendicular to each other at the center of the sensor substrate 10 (the center of the pressure receiving unit 12). Due to this symmetrical arrangement, even when residual stress occurs during curing of the resin, the residual stress is applied to the sensor substrate 10 and the base substrate 20 in a laterally and vertically symmetric manner, thereby decreasing effects on sensor characteristics. The structure other than the supports 414 and 424 and the plurality of electrically connecting portions 415a to 415d and 425a to 425d is similar to the structure of the first embodiment.

The present invention is applicable to force sensors for load measurement, the force sensors being mounted on user interfaces such as touch panels and controllers of mobile devices, and to a method of manufacturing the force censors.

What is claimed is:

1. A force sensor having a sensor substrate joined to a base substrate,
wherein the sensor substrate comprises:
a pressure receiving unit formed on a first surface of the sensor substrate;
a displacement portion configured to be displaced by an external load applied thereto through the pressure receiving unit;
a plurality of piezoresistance elements provided on a second surface of the sensor substrate opposite to the first surface, each of the plurality of piezoresistance elements having an electrical resistance that changes in accordance with an amount of displacement of the displacement portion;
a sensor-side support provided on the second surface of the sensor substrate, configured to displaceably support the displacement portion, the sensor-side support being formed in a shape having an inner peripheral edge enclosing an entire periphery of the displacement portion in plan view, at least part of the sensor-side support overlapping the plurality of piezoresistance elements in plan view; and
a plurality of sensor-side electrically connecting portions provided on the second surface along a periphery of the sensor substrate so as to surround an outer periphery of the sensor-side support, each of the plurality of sensor-side electrically connecting portions being electrically connected to a corresponding one of the plurality of piezoresistance elements, and located at a separated position that does not cross a virtual line passing through a center of the pressure receiving unit and a center of each of the plurality of piezoresistance elements,
wherein the base substrate includes:
a base-side support provided on a surface facing the sensor substrate, the base-side support being joined to the sensor-side support;
a plurality of base-side electrically connecting portions provided on the surface along a periphery of the base substrate so as to surround an outer periphery of the base-side support, the plurality of base-side electrically connecting portions being connected to the plurality of sensor-side electrically connecting portions; and
a plurality of electrode pads formed at ends of electrical wiring extending from the base-side electrically connecting portions, the plurality of electrode pads providing electrical connections to external circuitry,
and wherein the sensor-side support is joined to the base-side support with a metal joint layer disposed therebetween, and each of the plurality of sensor-side electrically connecting portions is joined to a corresponding one of the plurality of base-side electrically connecting portions with a metal joint layer disposed therebetween, each of the metal joint layers having a thickness of 300 nm or smaller and being formed of an alloy including one or more of materials selected from the group consisting of Al, Ti, Cr, Ni, Cu, Ru, Rh, Ir, Pt, Ta, Fe, and Au, or a multilayer film composed of two or more layers each including a material selected from the group consisting of Al, Ti, Cr, Ni, Cu, Ru, Rh, Ir, Pt, Ta, Fe, and Au.

2. The force sensor according to claim 1,
wherein the sensor-side support also serves as one of the plurality of sensor-side electrically connecting portions.

3. The force sensor according to claim 1,
wherein the base-side support has a shape having an inner peripheral edge corresponding to the inner peripheral edge of the sensor-side support in plan view, the sensor-side support and the base-side support being joined to each other so as to seal a space surrounded by the respective inner peripheral edges.

4. The force sensor according to claim 1, wherein the center of each of the piezoresistance elements is positioned within $\pm 10$ μm from a corresponding portion of the inner peripheral edge of the sensor-side support.

5. The force sensor according to claim 1, further comprising:
a package to which the base substrate is secured by adhesion, the package including:
a plurality of electrode pads electrically connected to the plurality of electrode pads of the base substrate by wire bonding, and
a plurality of terminals for external connection, electrically connected to the plurality of electrode pads of the package; and
sealing resin that secures the respective peripheries of the base substrate and the sensor substrate on the package.

6. A force sensor having a sensor substrate joined to a base substrate,
wherein the sensor substrate comprises:
a pressure receiving unit formed on a first surface of the sensor substrate;
a displacement portion configured to be displaced by an external load applied thereto through the pressure receiving unit;
a plurality of piezoresistance elements provided on a second surface of the sensor substrate opposite to the first surface, each of the plurality of piezoresistance elements having an electrical resistance that changes in accordance with an amount of displacement of the displacement portion;
a sensor-side support provided on the second surface of the sensor substrate, configured to displaceable support the displacement portion, the sensor-side support being formed in a shape having an inner peripheral edge enclosing an entire periphery of the displacement portion in plan view, at least part of the sensor-side support overlapping the plurality of piezoresistance elements in plan view; and
a plurality of sensor-side electrically connecting portions provided on the second surface along a periphery of the sensor substrate so as to surround an outer periphery of the sensor-side support, each of the plurality of sensor-side electrically connecting portions being electrically connected to a corresponding one of the plurality of piezoresistance elements, and located at a separated position that does not cross a virtual line passing through a center of the pressure receiving unit and a center of each of the plurality of piezoresistance elements,
wherein the base substrate includes:
a base-side support provided on a surface facing the sensor substrate, the base-side support being joined to the sensor-side support;
a plurality of base-side electrically connecting portions provided on the surface along a periphery of the base substrate so as to surround an outer periphery of the base-side support, the plurality of base-side electrically connecting portions being connected to the plurality of sensor-side electrically connecting portions; and a plurality of electrode pads formed at ends of electrical wiring extending from the base-side electrically connecting portions, the plurality of electrode pads providing electrical connections to external circuitry, wherein each of the plurality of sensor-side electrically connecting portions is disposed at a corresponding one of corners of the sensor substrate having a rectangular shape in plan view, and wherein the sensor-side support is symmetrical with respect to a center of the displacement portion in plan view.

7. The force sensor according to claim 6, wherein the sensor-side support has an outer periphery formed along the periphery of the sensor substrate except for the corners of the sensor substrate in plan view.

8. The force sensor according to claim 6, wherein the sensor-side support also serves as one of the plurality of sensor-side electrically connecting portions.

9. The force sensor according to claim 6, wherein the base-side support has a shape having an inner peripheral edge corresponding to the inner peripheral edge of the sensor-side support in plan view, the sensor-side support and the base-side support being joined to each other so as to seal a space surrounded by the respective inner peripheral edges.

10. The force sensor according to claim 6, wherein the center of each of the piezoresistance elements is positioned within ±10 μm from a corresponding portion of the inner peripheral edge of the sensor-side support.

11. The force sensor according to claim 6, further comprising:

a package to which the base substrate is secured by adhesion, the package including:
a plurality of electrode pads electrically connected to the plurality of electrode pads of the base substrate by wire bonding, and
a plurality of terminals for external connection electrically connected to the plurality of electrode pads of the package; and
sealing resin that secures the respective peripheries of the base substrate and the sensor substrate on the package.

12. A method of manufacturing a force sensor, the method comprising:

forming a plurality of sensor structures on one of front and rear panel surfaces of a sensor substrate panel having displacement portions, each of the plurality of sensor structures being formed for respective one of the plurality of displacement portions, each of the plurality of sensor structures including:
a plurality of piezoresistance elements, each having an electrical resistance which changes in accordance with an amount of displacement of the displacement portion that is displaced,
a sensor-side support formed in a shape having an inner peripheral edge enclosing an entire periphery of the displacement portion in plan view, at least part of the sensor-side support overlapping the plurality of piezoresistance elements in plan view, the sensor-side support displaceably supporting the displacement portion; and
a plurality of sensor-side electrically connecting portions provided along a periphery of the sensor structure so as to surround an outer periphery of the sensor-side support, each of the plurality of sensor-side electrically connecting portions being electrically connected to a corresponding one of the plurality of piezoresistance elements and located at a separated position that does not cross a virtual line passing through a center of the pressure receiving unit and a center of each of the plurality of piezoresistance elements;

forming a plurality of base structures on one of front and rear panel surfaces of a base substrate panel, each of the plurality of base structures including:
a plurality of base-side electrically connecting portions provided in positions corresponding to the plurality of sensor-side electrically connecting portions;
a plurality of electrode pads formed at ends of electrical wiring extending from the base-side electrically connecting portions so as to be wire-bondable, and
a base-side support provided in an area surrounded by the plurality of base-side electrically connecting portions so as to correspond to the sensor-side support;

joining the sensor substrate panel and the base substrate panel to each other by pressing the sensor substrate panel and the base substrate panel against each other and simultaneously joining the plurality of sensor-side electrically connecting portions to the corresponding base-side electrically connecting portions and the sensor-side supports to the corresponding base-side supports in an atmosphere in which the temperature is in a range from room temperature to a temperature lower than 250° C.;

forming a plurality of pressure receiving units on the other of the front and rear panel surfaces of the sensor substrate panel, an external load to be applied to a displacement portion of each sensor structure through a corresponding one of the pressure receiving units; and cutting the sensor substrate panel and the base substrate panel into chips each including a pair of the sensor structure and the base structure.

13. The method of manufacturing the force sensor according to claim 12, wherein each of the plurality of sensor-side electrically connecting portions, each of the plurality of base-side electrically connecting portions, each of the sensor-side supports, and each of the base-side supports have respective metal joint layers formed thereon, each metal joint layer having a thickness of 300 nm or smaller and being formed of an alloy including one or more of materials selected from the group consisting of Al, Ti, Cr, Ni, Cu, Ru, Rh, Ir, Pt, Ta, Fe, and Au, or a multilayer film composed of two or more layers each including a material selected from the group consisting of Al, Ti, Cr, Ni, Cu, Ru, Rh, Ir, Pt, Ta, Fe, and Au, and wherein each of the plurality of sensor-side electrically connecting portions is joined to a corresponding one of the plurality of base-side electrically connecting portions with the metal joint layers interposed therebetween, and each of the sensor-side supports is joined to a corresponding one of the base-side supports with the metal joint layers interposed therebetween.

* * * * *